US010837841B2

(12) United States Patent
Sun

(10) Patent No.: US 10,837,841 B2
(45) Date of Patent: Nov. 17, 2020

(54) TEMPERATURE MEASURING ASSEMBLY AND ELECTRICAL DEVICE

(71) Applicant: TYCO ELECTRONICS (SHANGHAI) CO. LTD., Shanghai (CN)

(72) Inventor: Pengcheng Sun, Shanghai (CN)

(73) Assignee: TYCO ELECTRONICS (SHANGHAI) CO. LTD., Shanghai (CN)

(*) Notice: Subject to any disclaimer, the term of this patent is extended or adjusted under 35 U.S.C. 154(b) by 456 days.

(21) Appl. No.: 15/674,676

(22) Filed: Aug. 11, 2017

(65) Prior Publication Data

US 2018/0045577 A1 Feb. 15, 2018

(30) Foreign Application Priority Data

Aug. 12, 2016 (CN) ...................... 2016 2 0877446 U
Nov. 11, 2016 (CN) ...................... 2016 2 1262508 U

(51) Int. Cl.
*G01K 1/16* (2006.01)
*G01K 1/18* (2006.01)
*G01K 7/22* (2006.01)

(52) U.S. Cl.
CPC ................. *G01K 1/16* (2013.01); *G01K 1/18* (2013.01); *G01K 7/22* (2013.01)

(58) Field of Classification Search
CPC .. G01K 1/14; G01K 1/16; G01K 7/16; H01M 10/482; H01M 10/486; H01M 2220/20; H05K 1/181; H05K 3/341; H05K 2201/10022; H05K 2201/10151; H05K 2201/10378

USPC ........................ 374/29, 39, 137, 44, 5, 208
See application file for complete search history.

(56) References Cited

U.S. PATENT DOCUMENTS

| 5,286,921 A * | 2/1994 | Fontaine ................ G01K 1/026 174/84 R |
| 5,372,427 A * | 12/1994 | Padovani ................. G01K 1/16 338/22 R |
| 8,206,032 B2 * | 6/2012 | Wakabayashi ........ F16B 21/076 374/100 |

(Continued)

*Primary Examiner* — Brandi N Hopkins
*Assistant Examiner* — Janice M Soto
(74) *Attorney, Agent, or Firm* — Saxton & Stump, LLC

(57) ABSTRACT

A temperature measuring assembly and an electrical device. The temperature measuring assembly includes a heat conducting element and a temperature measuring element. The heat conducting element is arranged for conducting heat of a to-be-measured device. The temperature measuring element is thermally conductive with the heat conducting element so as to measure a temperature signal of the to-be-measured device according to the heat conducted by the heat conducting element and output the temperature signal to an output connecting element. The heat conducting element and the temperature measuring element are elements separately formed and may be connected as an integral element. The heat conducting element of the temperature measuring assembly has a good insulation and thermal conduction performance and is particularly suitable for measuring the temperature of the to-be-measured device and capable of shortening a temperature measurement response time of the temperature measuring element.

18 Claims, 14 Drawing Sheets

(56) References Cited

U.S. PATENT DOCUMENTS

| | | | | |
|---|---|---|---|---|
| 2003/0223474 | A1* | 12/2003 | Roepke | G01K 1/16 374/152 |
| 2013/0279536 | A1* | 10/2013 | Choi | G01K 1/10 374/137 |
| 2015/0214583 | A1* | 7/2015 | Lim | H01M 2/1016 429/90 |
| 2016/0035467 | A1* | 2/2016 | Haydin | H01C 1/02 429/90 |
| 2016/0380319 | A1* | 12/2016 | Rhein | H01M 10/482 429/90 |
| 2017/0271642 | A1* | 9/2017 | Groshert | H01M 2/206 |

* cited by examiner

TEMPERATURE MEASURING ASSEMBLY AND ELECTRICAL DEVICE

TECHNICAL FILED

The present disclosure generally relates to a structure for measuring temperature, and more particularly to a temperature measuring assembly and an electrical device.

BACKGROUND

Generally, a to-be-measured device can only work stably and safely within a certain temperature range. Therefore, the temperature of the to-be-measured device needs to be monitored. Accordingly, a response speed to a temperature measurement of the to-be-measured device reflects the performance of the temperature measurement, which also has a significant influence on the operation of a device associated therewith. For example, for a vehicle, the response speed of the associated device plays an important role in driving safety. This requires that the to-be-measured device on the vehicle should acquire its temperature as quickly as possible. Moreover, with an increase of new energy applications, electric vehicles become more and more popular among consumers. The steady operation of a vehicular battery pack as a power source of an electric vehicle is key to the vehicle's safety performance. The vehicular battery pack outputs a relatively large current when working, which easily causes a temperature rise. Generally, in order to guarantee driving safety of a vehicle, operation parameters of the vehicular battery pack need to be monitored, while the temperature of the vehicular battery is just one of the parameters that need to be particularly monitored.

SUMMARY OF THE INVENTION

One of the objectives of the present disclosure is to provide a securely connected temperature measuring assembly with a quick temperature measurement response speed, and an electrical device, so as to overcome the drawbacks of the prior art.

To achieve the objectives above, the present disclosure is implemented through the following technical solutions.

According to a first aspect of the present disclosure, there provides a temperature measuring assembly comprising a heat conducting element and a temperature measuring element, wherein the heat conducting element is arranged for conducting heat of a to-be-measured device, the temperature measuring element and the heat conducting element are arranged to be thermally conductive so as to measure a temperature signal of the to-be-measured device according to the heat conducted by the heat conducting element and output the temperature signal to an output connecting element; and the heat conducting element and the temperature measuring element are elements separately formed and may be arranged to be connected as an integral element.

In a preferable embodiment, the heat conducting element is a ceramic element. In another preferable embodiment, the heat conducting element has a first heat conducting face and a second heat conducting face, wherein the first heat conducting face and the second heat conducting face are disposed back-to-back, the first heat conducting face is arranged to be thermally conductive with the temperature measuring element, and the second heat conducting face is arranged to be thermally conductive with the to-be-measured device. In yet another preferable embodiment, the temperature measuring element is a thermistor. In another preferable embodiment, the temperature measuring element further comprises an output connecting element that is electrically connected to the temperature measuring element. More preferably, the output connecting element is arranged to extend to the in-between of the temperature measuring element and the heat conducting element. More preferably, the output connecting element is a flexible flat cable that includes two electrically conductive layers to which the temperature measuring element is electrically connected, respectively. Even more preferably, the electrically conductive layers have a first electrically conductive surface and a second electrically conductive surface, wherein the first electrically conductive surface and the second electrically conductive surface are disposed back-to-back, the first electrically conductive surface is configured to be connected to the temperature measuring element by welding, and the second electrically conductive surface is configured to be in face-to-face contact with the heat conducting element. Yet more preferably, the two electrically conductive layers are disposed at an interval, and the temperature measuring element is arranged to at least partially extend into contact with the heat conducting element.

In some embodiments as described above, the temperature measuring assembly further comprises a sealing connection element that is arranged to be in contact with the heat conducting element and the temperature measuring element, respectively, and to integrally connect the heat conducting element and the temperature measuring element. Preferably, a thermal conductivity of the heat conducting element is greater than that of the sealing connection element. In a preferable embodiment, the sealing connection element is arranged to cover and enclose the temperature measuring element so as to seal the temperature measuring element. In another preferable embodiment, the sealing connection element is a cured body of a liquid glue or a cured body of a melt silicone liquid.

In some embodiments as described above, preferably, the temperature measuring assembly further comprises a holding frame that has a mounting cavity in which all the temperature measuring elements are accommodated. More preferably, one end of the mounting cavity has a mounting opening through which at least part of the heat conducting element is accommodated in the mounting cavity. More preferably, the temperature measuring assembly further comprises an output connecting element that is electrically connected with the temperature measuring element. Even more preferably, a limiting notch is provided on one side wall of the holding frame, wherein the limiting notch is arranged to be in communication with the mounting cavity, and part of the output connecting element is provided in the limiting notch. Yet more preferably, the temperature measuring assembly further comprises a sealing connection element that is accommodated in the mounting cavity and configured to wrap up and seal the temperature measuring element.

According to a second aspect of the present disclosure, there further provides an electrical device comprising a to-be-measured device and the temperature measuring assembly according to any one of the above mentioned, wherein the to-be-measured device is arranged to be in thermal conduction with the heat conducting element. Preferably, the to-be-measured device is a bus-bar.

Compared with the prior art, the heat conducting element of the temperature measuring assembly of the present disclosure has a good insulation and thermal conduction performance and is particularly suitable for measuring the temperature of the to-be-measured device and capable of shortening a temperature measurement response time of the temperature measuring element.

Further, the first heat conducting face and the second heat conducting face of the heat conducting element are provided back-to-back, which shortens a thermal conduction distance between the to-be-measured device and the temperature measuring element and also shortens the time for temperature measurement. The first heat conducting face and the second heat conducting face are planar, which may enlarge a heat conducting area and thereby shorten the time for temperature measurement.

Further, the holding frame of the temperature measuring assembly of the present disclosure may provide protection for the temperature measuring element, and prevent the connection performance between the temperature measuring element and the connecting element from being affected by external environment and substances, thereby guaranteeing the performance of batch products with a high yield. Further, the mounting cavity of the holding frame can hold a liquid sol-gel and melt silicone, etc., and form a sealing connection element of a preset shape to wrap up and seal the temperature measuring element, thereby improving the protective performance on the temperature measuring element.

DETAILED DESCRIPTION OF EMBODIMENTS

Hereinafter, the present disclosure will be described in detail with reference to the accompanying drawings.

Embodiment 1

Figure 1:
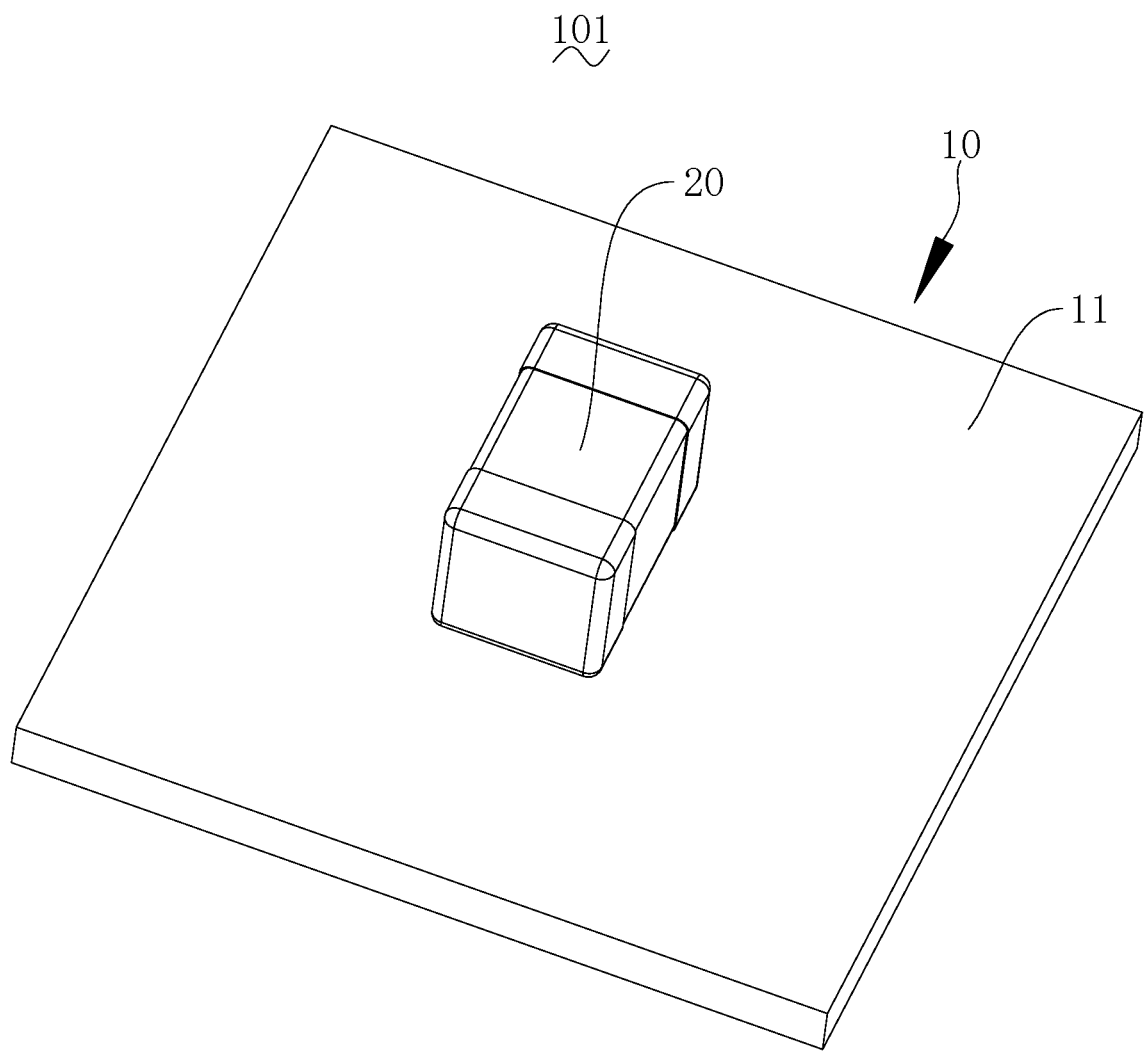
FIG. 1 is a structural diagram of a first embodiment of a temperature measuring assembly according to the present disclosure.
Figure 2:
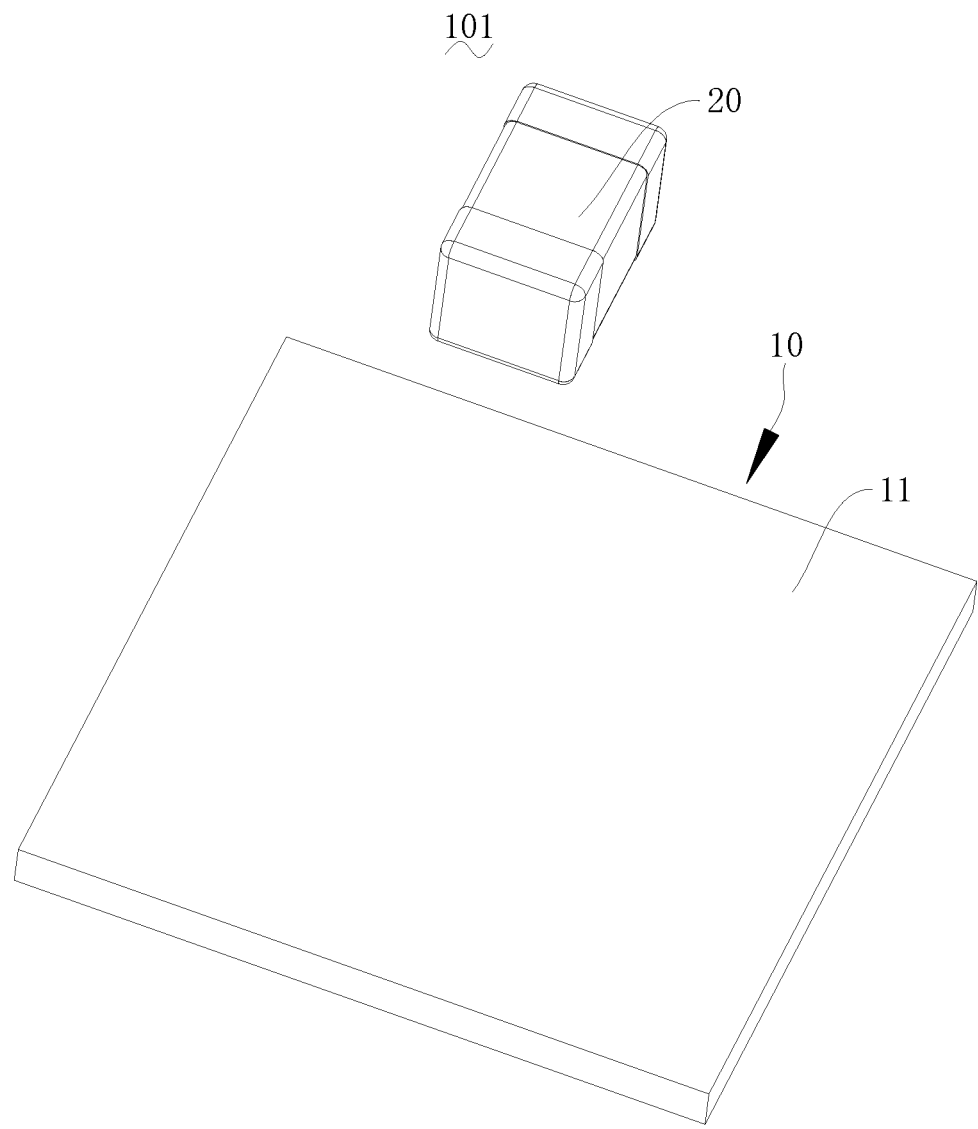
FIG. 2 is an exploded diagram of the temperature measuring assembly of FIG. 1.
Figure 3:
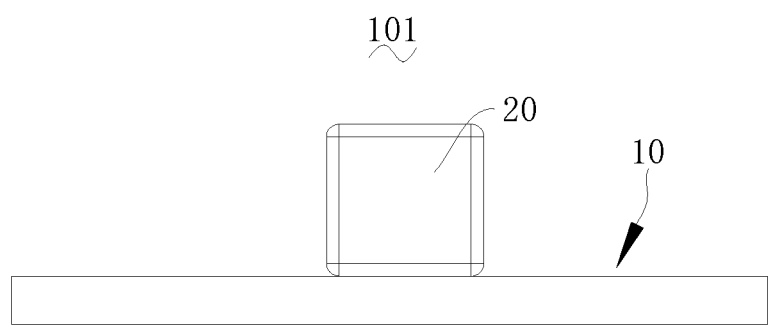
FIG. 3 is a front view of the temperature measuring assembly of FIG. 1.

With reference to FIGS. 1-3, a temperature measuring assembly 101 provided by the present disclosure is shown. The temperature measuring assembly 101 comprises a heat conducting element 10 and a temperature measuring element 20. The heat conducting element 10 is arranged to conduct the heat of a to-be-measured device (as will be described infra) and to be thermally conductive with the temperature measuring element 20 to measure the temperature of the to-be-measured device. The heat conducting element 10 and the temperature measuring element 20 are elements that are individually and separately formed, which may also be connected as an integral element. That is, when they are not assembled integrally, the heat conducting element 10 and the temperature measuring element 20 are separate elements, which need to be manufactured individually.

A specific shape and surface area of the heat conducting element 10 may be selected according to needs. Specific components of the heat conducting element 10 are only required to satisfy corresponding heat conducting demands. To be capable of safely and conveniently measuring the temperature of an electronic device, the heat conducting element 10 is an electrically insulating element, i.e., an electrically non-conductive insulation body. A thermal conductivity of the heat conducting element 10 may be selected according to needs. It may be envisaged that the thermal conductivity may also be referred to as a heat conductivity coefficient, with a unit of watts per meter kelvin (W/(m·K)). To avoid heat loss and to be capable of quickly conducting heat to the temperature measuring element 20, the thermal conductivity of the heat conducting element 10 may be greater than that of a sealing connection element 40 (as will be described infra). The extent to which the thermal conductivity of the heat conducting element 10 is greater than that of the sealing connection element 40 may be selected as needed. The thermal conductivity of the heat conducting element 10 may be at least ten times (e.g., ten times, eighteen times, or thirty-four times) higher than that of the sealing connection element 40. In order to enhance the temperature measurement precision and the response speed of the temperature measuring element 20 as much as possible, the thermal conductivity of the heat conducting element 10 may be at least 100 times (e.g., 100 times, 167 times, or 537 times) higher than that of the sealing connection element 40. In order to enhance heat conduction performance, the heat conducting element 10 may be a ceramic heat conducting element. In the present embodiment, the heat conducting element 10 is an AlN (Aluminum Nitride) ceramic integrated element, i.e., a ceramic with AlN as a principal crystalline phase. By employing the AlN ceramic, the heat conducting element 10 can achieve advantages such as a high thermal conductivity, a high strength, corrosion-resistance, and high resistivity, etc., i.e., having a good thermally conductive and electrically insulative performance. To reduce thermal resistance as much as possible so as to shorten the response time of the temperature measuring element 20, the heat conducting element 10 may be arranged to be in contact with the temperature measuring element 20. A first heat conducting face 11 (as will be described infra) of the heat conducting element 10 may be in contact with the temperature measuring element 20.

To further reduce thermal resistance so as to shorten the response time of the temperature measuring element 20, the heat conducting element 10 may be substantially in a panel shape. Accordingly, the heat conducting element 10 has a first heat conducting face 11 and a second heat conducting face (not shown). The first heat conducting face 11 and the second heat conducting face are provided back-to-back. Specifically, as shown in the figure, the first heat conducting face 11 and the second heat conducting face are upper and lower surfaces relative to each other. To reduce thermal resistance so as to shorten the response time of the temperature measuring element 20, at least one of the first heat conducting face 11 and the second heat conducting face may be planar. In the present embodiment, both the first heat conducting face 11 and the second heat conducting face are planar. The first heat conducting face 11 may be arranged to be in thermal conduction with the temperature measuring element 20. The second heat conducting face may be arranged to be thermally conductive with a to-be-measured device (as will be described infra). Therefore, the above manner of arranging the heat conducting element 10 can achieve a shortest thermal conduction distance between the to-be-measured device and the temperature measuring element 20; i.e., a thickness of the heat conducting element 10 is the shortest thermal conduction distance, thereby shortening the response time of the temperature measuring element 20. The distance between the first heat conducting face 11 and the second heat conducting face (i.e., the thickness of the heat conducting element 10) is only required to be as short as possible while satisfying safe isolation of the temperature measuring element 20 from the to-be-measured device. Further, the first heat conducting face 11 may be provided to be planar, thereby enlarging a contact area between the heat conducting element 10 and the temperature measuring element 20, and further shortening the response time of the temperature measuring element 20. The second heat conducting face may be provided to be planar, which also correspondingly shortens the response time of the temperature measuring element 20.

The arranging manner of the temperature measuring element 20 is only required to be in thermally conductive connection with the heat conducting element 10. In the present embodiment, in order to reduce thermal resistance as much as possible to shorten the response time, the temperature measuring element 20 is arranged to be in contact with the first heat conducting face 11 of the heat conducting element 10; moreover, their contact portions are both planar. The temperature measuring element 20 may be electrically connected to an output connecting element 30 (as will be described infra) to output the measured temperature signal of the to-be-measured device. To achieve stable electrical connection between the temperature measuring element 20 and the output connecting element 30, the temperature measuring element 20 may be connected to the output connecting element 30 by welding. Selection of the specific type and specification of the temperature measuring element 20 is only required to satisfy corresponding temperature measuring needs. To be capable of converting the temperature signal into an electrical signal so as to facilitate fast output, the temperature measuring element 20 may be a thermosensitive resistance. To enhance the secure mounting performance and assembly efficiency of the temperature measuring element 20, the temperature measuring element 20 is an SMD (surface-mount devices) resistor. Further, to enhance the measurement precision of the temperature measuring element 20, the temperature measurement element 20 may be a negative temperature coefficient (NTC) thermistor.

Embodiment 2

Figure 4:
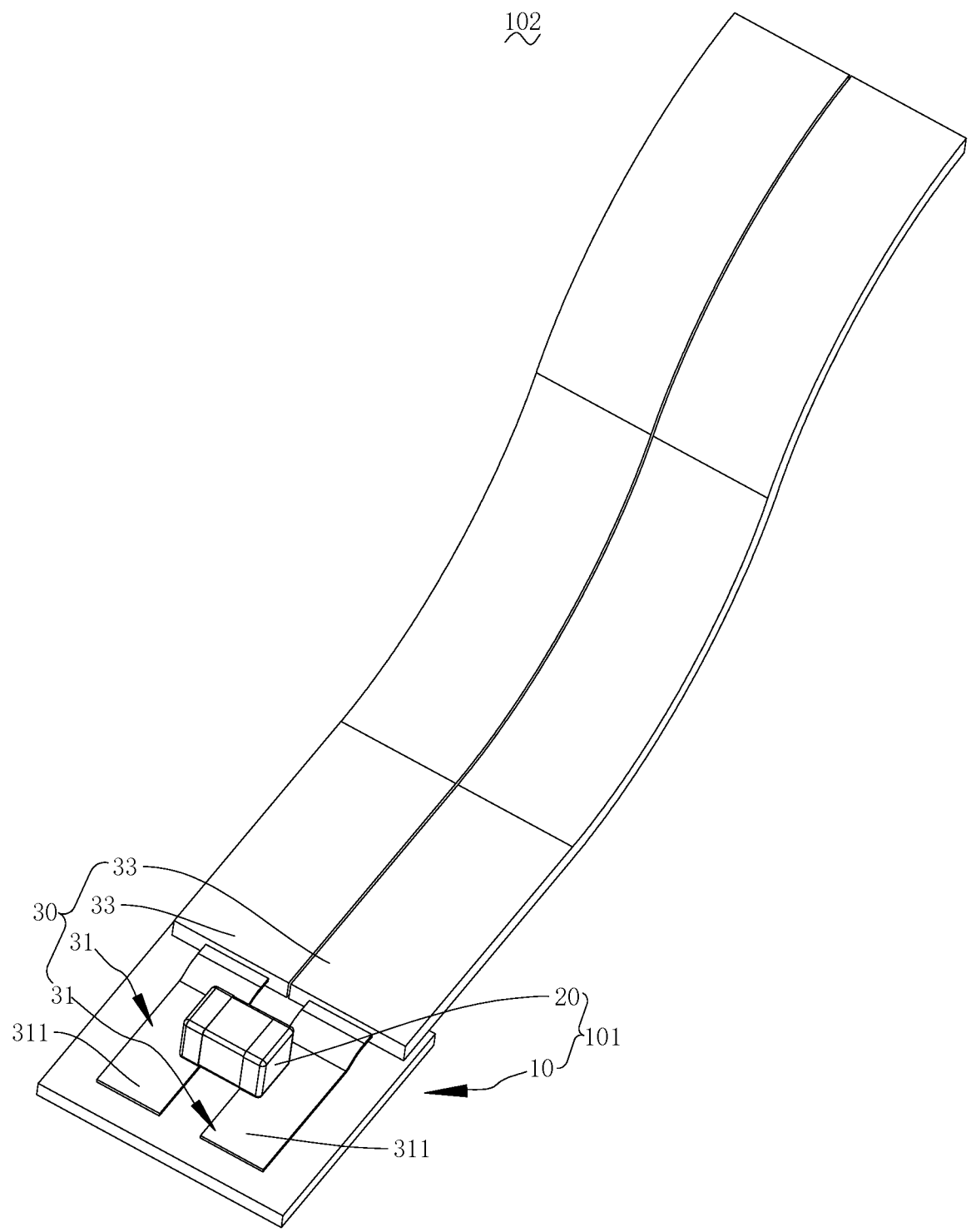
FIG. 4 is a structural diagram of a second embodiment of a temperature measuring assembly according to the present disclosure.
Figure 5:
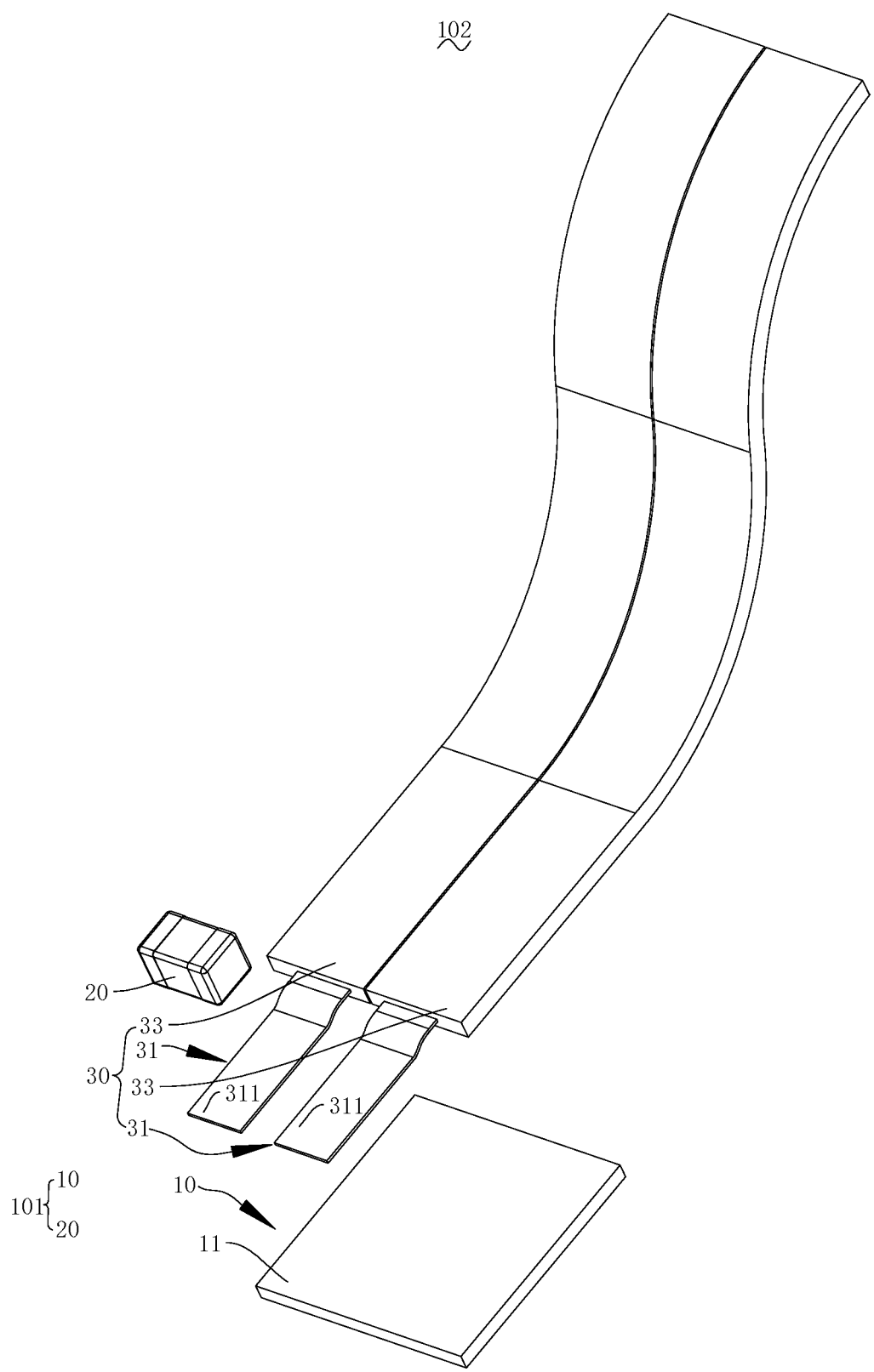
FIG. 5 is an exploded diagram of the temperature measuring assembly of FIG. 4.

FIGS. 4 and 5, as a variation of Embodiment 1, show a temperature measuring assembly 102 provided by the present disclosure. Different from Embodiment 1, the temperature measuring assembly 102 of the present embodiment further comprises an output connecting element 30 electrically connected with the temperature measuring element 10.

The output connecting element 30 is arranged for transmitting a temperature signal measured by the temperature measuring element 10. According to different needs of temperature signal processing, the output connecting element 30 may be electrically connected with different temperature signal processing devices, e.g., a processor. In the present embodiment, the output connecting element 30 is arranged to be electrically connected with a BMS (Battery Management System). The specific type and specification of the output connecting element 30 are only required to be capable of outputting the temperature signal. The output connecting element 30 may be a circuit board or even a cable. The circuit board may be an FPC (Flexible Printed Circuit Board). The output connecting element 30 extends to the in-between of the temperature measuring element 20 and the heat conducting element 10 in order to sufficiently save the mounting space and form a stable electrical connection with the temperature measuring element 20.

In the present embodiment, to make the output connecting element 30 easily bent so as to adapt different mounting environments and save cost, the output connecting element 30 may be a flexible flat cable (FFC). To form a stable electrical connection with the temperature measuring element 10, the output connecting element 30 comprises two electrically conductive layers 31. It may be understood that the electrically conductive layer 31 is an electrically conductive circuit, which may be a copper foil circuit. The two electrically conductive layers 31 and the temperature measuring elements 30 are welded for electrical connection. The two electrically conductive layers 31 are electrically connected with the temperature measuring element 20. The electrical connection manner between the two electrically conductive layers 31 and the temperature measuring element 20 may be selected according to needs. In the present embodiment, the temperature measuring element 20 is electrically connected in series with the two electrically conductive layers 31, respectively. To facilitate mutual insulation and cause the temperature measuring element 20 to easily contact with the heat conducting element, the two electrically conductive layers 31 are provided at an interval. To facilitate transmission of temperature signals, the two electrically conductive layers 31 of the output connecting element 30 are disposed in parallel at an interval. The electrically conductive layer 31 comprises a free end (not shown). To sufficiently save materials and mounting space, the free ends of the two electrically conductive layers 31 protrude from an insulation layer 33 (as described infra) and are electrically connected with the temperature measuring element 10. Specifically, the free ends of the two electrically conductive layers 31 extend to the in-between of the temperature measuring element 20 and the heat conducting element 10 and are connected with the temperature measuring element 10 by welding.

The electrically conductive layer 31 has a first electrically conductive surface 311 and a second electrically conductive surface (not shown). The first electrically conductive surface 311 and the second electrically conductive surface are arranged back-to-back. The first electrically conductive surface 311 is electrically connected with the temperature measuring element 20. The second electrically conductive surface and the ceramic heat conducting element 10 are arranged to be in face-to-face contact, thereby enhancing the thermal conduction performance, e.g., which may be a contact between a convex curve and a recessed curve. In the present embodiment, the second electrically conductive surface and the heat conducting element 10 are arranged to be in plane-to-plane contact, such that the mounting space is sufficiently utilized, and the thermal resistance is reduced to enhance thermal conduction performance.

To achieve a better insulation performance, the output connecting element 30 further comprises an insulation layer 33. The insulation layer 33 is arranged to cover and wrap up the two electrically conductive layers 31; i.e., the electrically conductive layers 31 are embedded in the insulation layer 33. The insulation layer 33 may be made of any insulation material, e.g., plastic or rubber materials.

Embodiment 3

Figure 6:
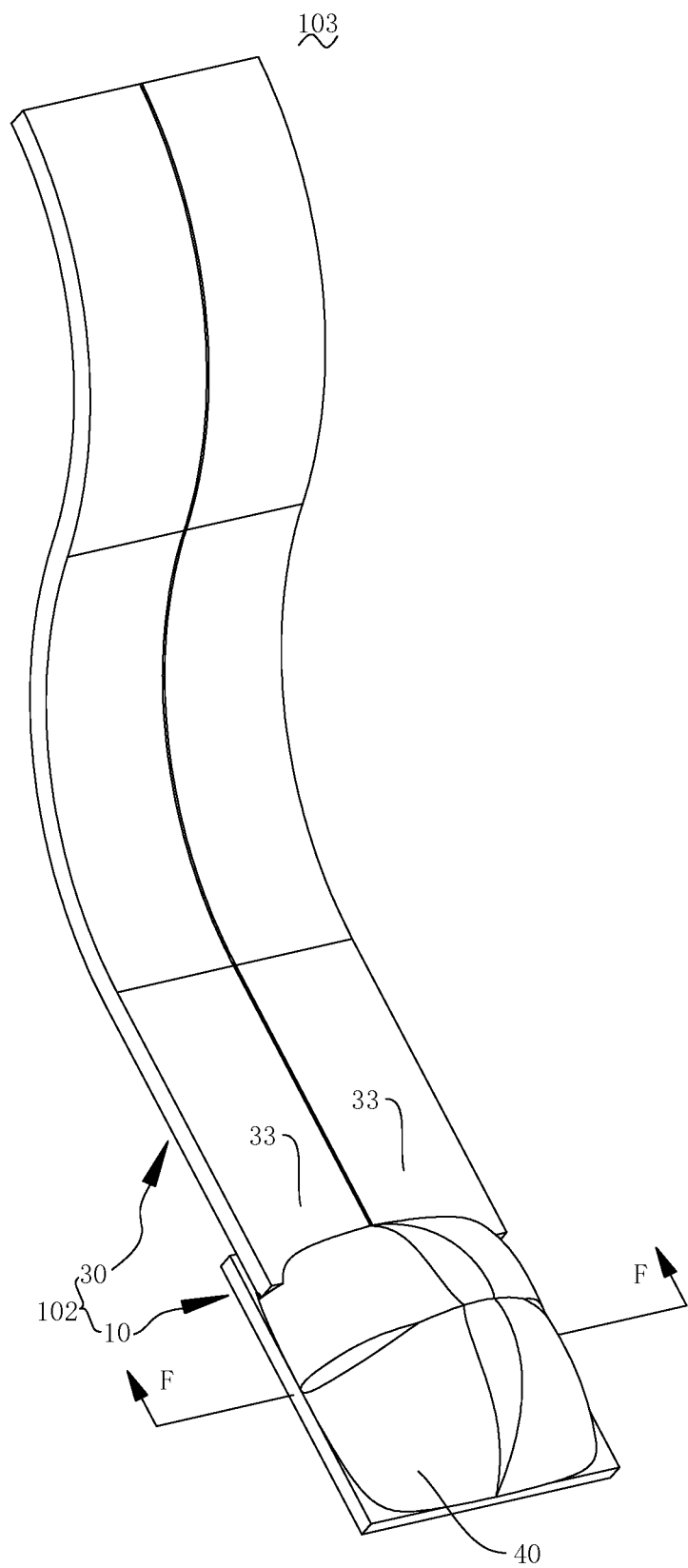
FIG. 6 is a structural diagram of a third embodiment of a temperature measuring assembly according to the present disclosure.

With reference to FIG. 6, as a variation of Embodiment 2, a temperature measuring assembly 103 provided in the Embodiment 3 is shown. Different from Embodiment 2, the temperature measuring assembly 103 in the present embodiment further comprises a sealing connection element 40. The sealing connection element 40 is in contact with the heat conducting element 10 and the temperature measuring element 20, respectively, and integrally connects the heat conducting element 10 and the temperature measuring element 20. In other words, the sealing connection element 40 is only required to securely and integrally connect the heat conducting element 10 and the temperature measuring element 20 and cause the portions thereof in contact with the sealing connection element 40 to be sealed.

Preferably, the sealing connection element 40 is arranged to cover and wrap up the temperature measuring element 10 so as to seal the temperature measuring element 10. A specific material or structure of the sealing connection element 40 is only required to be capable of sealing the temperature measuring element 10. For example, the sealing connection element 40 may be a cured element of a liquid glue or a melt silicone, i.e., an integral element formed by curing the liquid glue or the melt silicone. In the present embodiment, the sealing connection element 40 is integrally cured by a liquid ultraviolet-curable adhesive. The ultraviolet-curable adhesive is also referred to as a photosensitive adhesive, shadowless glue or UV (Ultraviolet Rays) adhesive. In the present embodiment, the sealing connection element 40 is arranged to cover both of the electrically conductive layers 31 so as to enhance the insulation performance of the output connecting element 30 and the stable electrical connection performance between the output connecting element 30 and the temperature measuring element 10. To enhance the secure performance, the sealing connection element 40 extends onto the heat conducting element 20 and is arranged to be integrally bonded with the heat conducting element 20. Specifically, the sealing connection element 40 covers the first heat conducting faces 11 of all the heating conducting elements 10.

Figure 7:
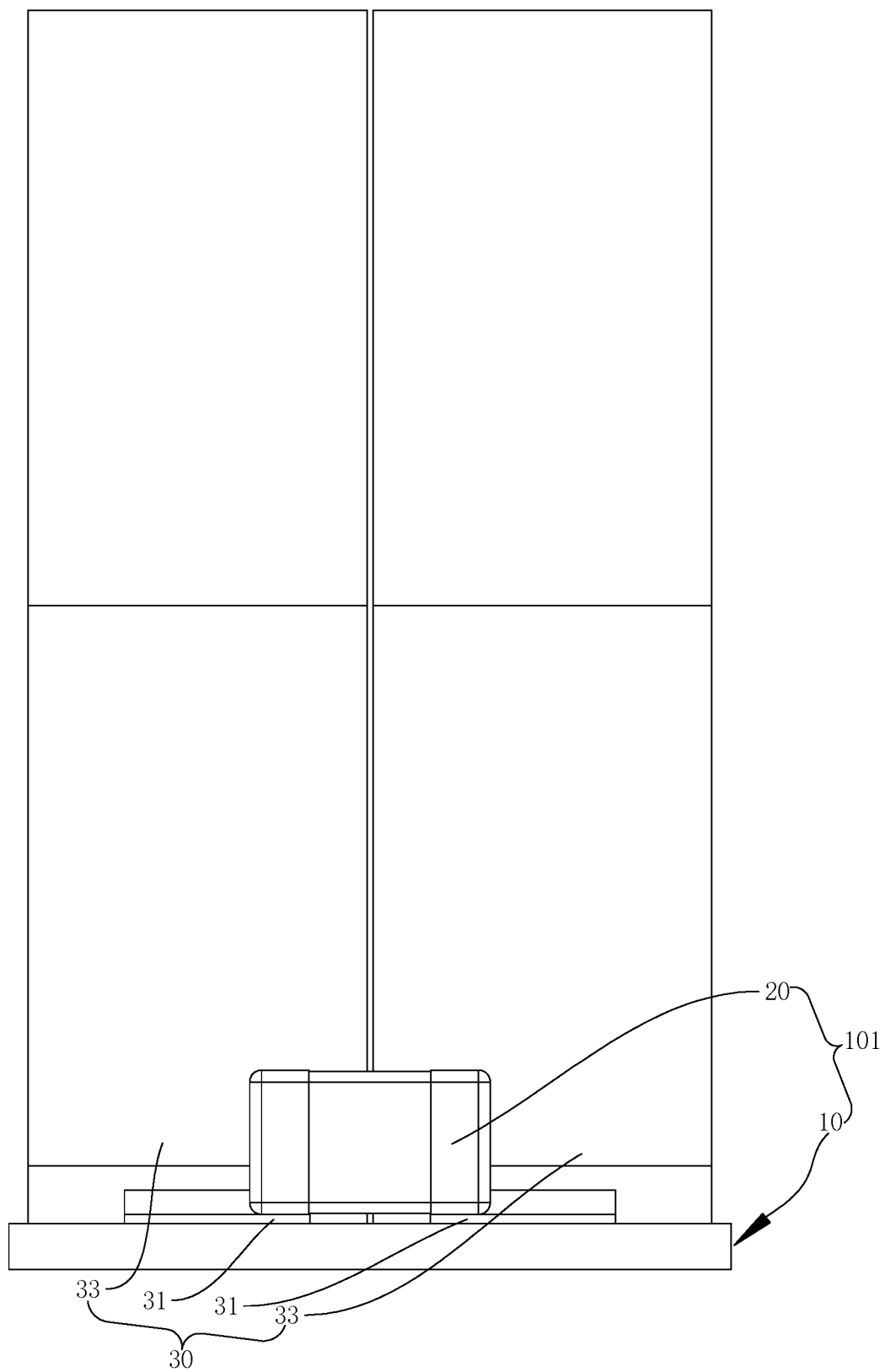
FIG. 7 is a front view of the temperature measuring assembly of FIG. 6 without showing a sealing connection element.
Figure 8:
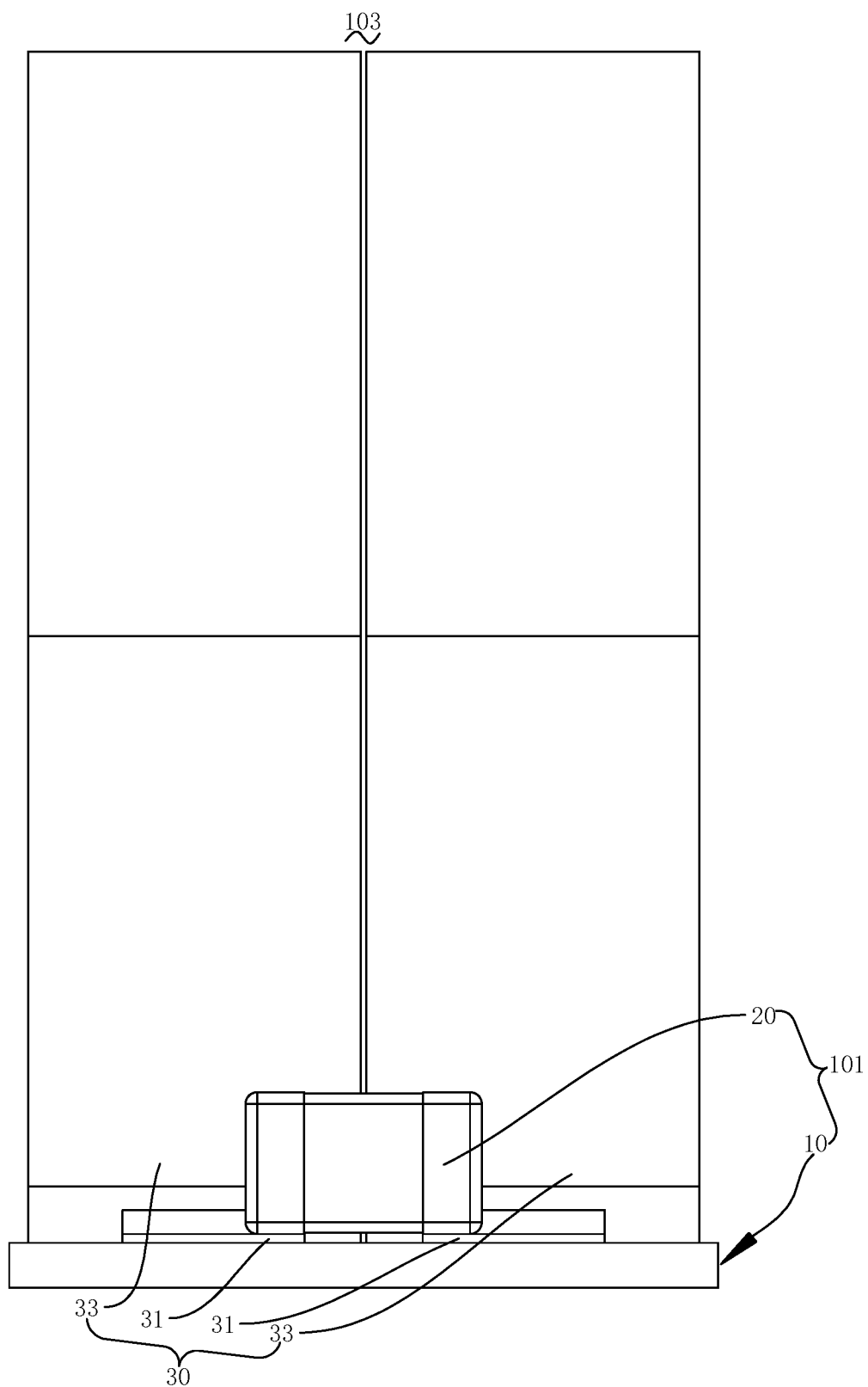
FIG. 8 is a sectional view of the temperature measuring assembly of FIG. 6 along line F-F.

With reference to FIG. 7, free ends of the electrically conductive layers 31 extend to the in-between of the temperature measuring element 20 and the heat conducting element 10, to enable the temperature measuring element 20 to be spaced apart from the heat conducting element 10. Along with reference to FIG. 8, the sealing connection element 40 seals the space; i.e., the sealing connection element 40 extends to fill the space between the temperature measuring element 20 and the heat conducting element 10, thereby reducing thermal resistance. Specifically, the temperature measuring element 20 crosses over the free ends of the two spaced electrically conductive layers 31. The two electrically conductive layers 31 enable the space to be formed between the temperature measuring element 20 and the heat conducting element 10.

Embodiment 4

Figure 9:
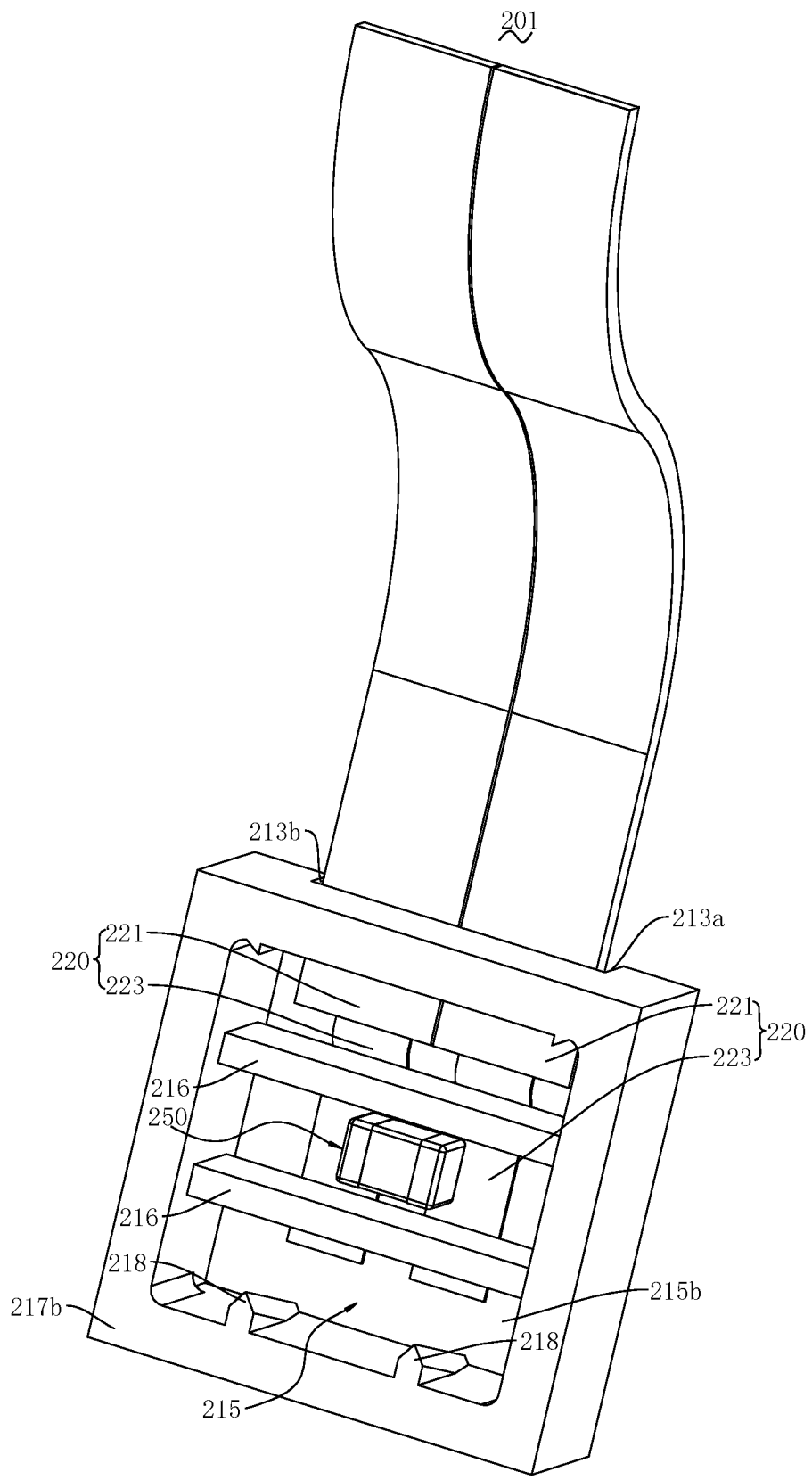
FIG. 9 is a structural diagram of a fourth embodiment of a temperature measuring assembly according to the present disclosure.

With reference to FIG. 9, the present disclosure further provides a temperature measuring assembly 201. The temperature measuring assembly 201 comprises a holding frame 210, an output connecting element 220, and a temperature measuring element 230. At least part of the output connecting element 220 is provided on the holding frame 210 and arranged to be electrically connected with the temperature measuring element 230.

Figure 10:
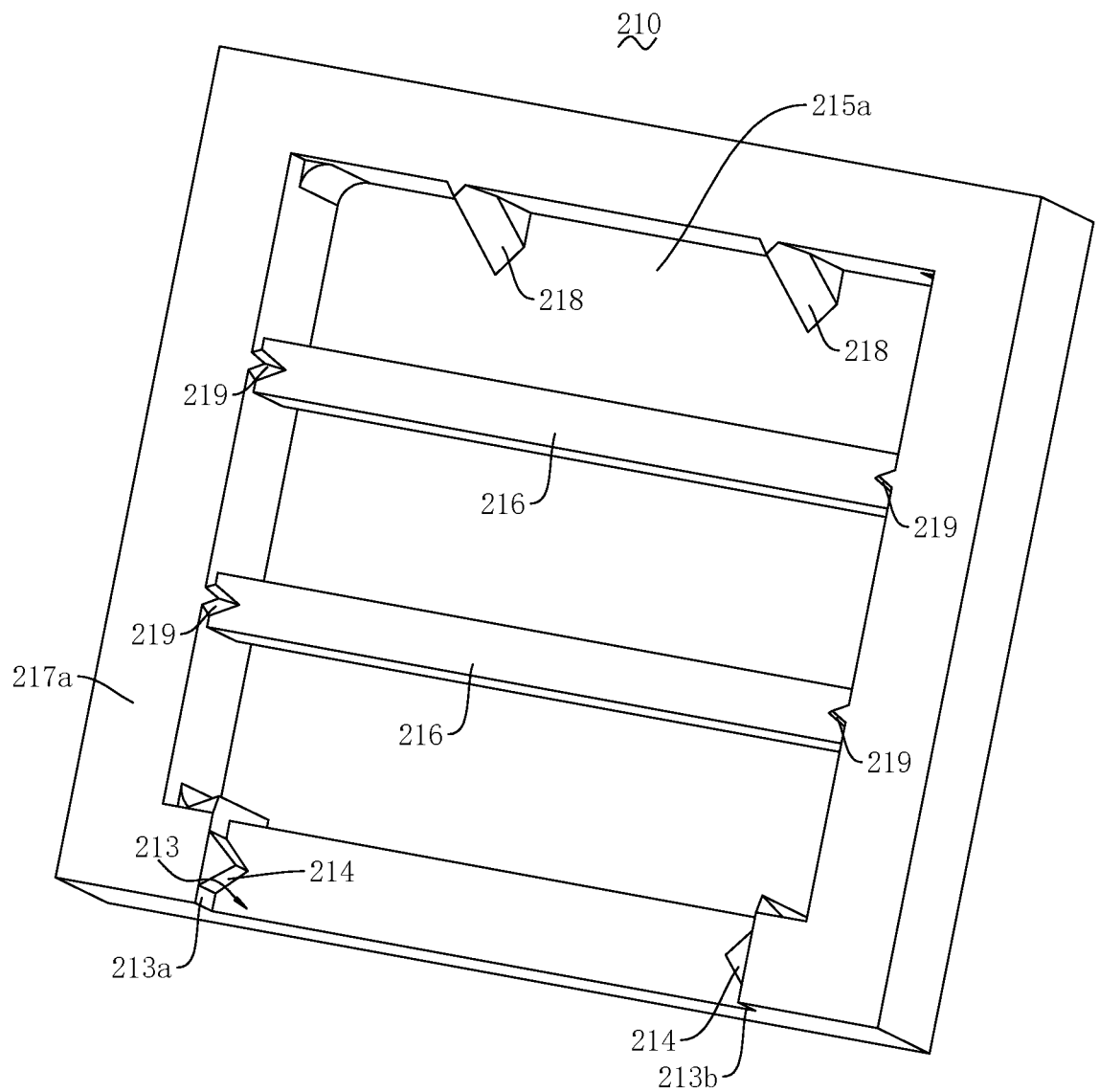
FIG. 10 is a structural diagram of the holding frame in FIG. 9 with a shown bottom face.
Figure 11:
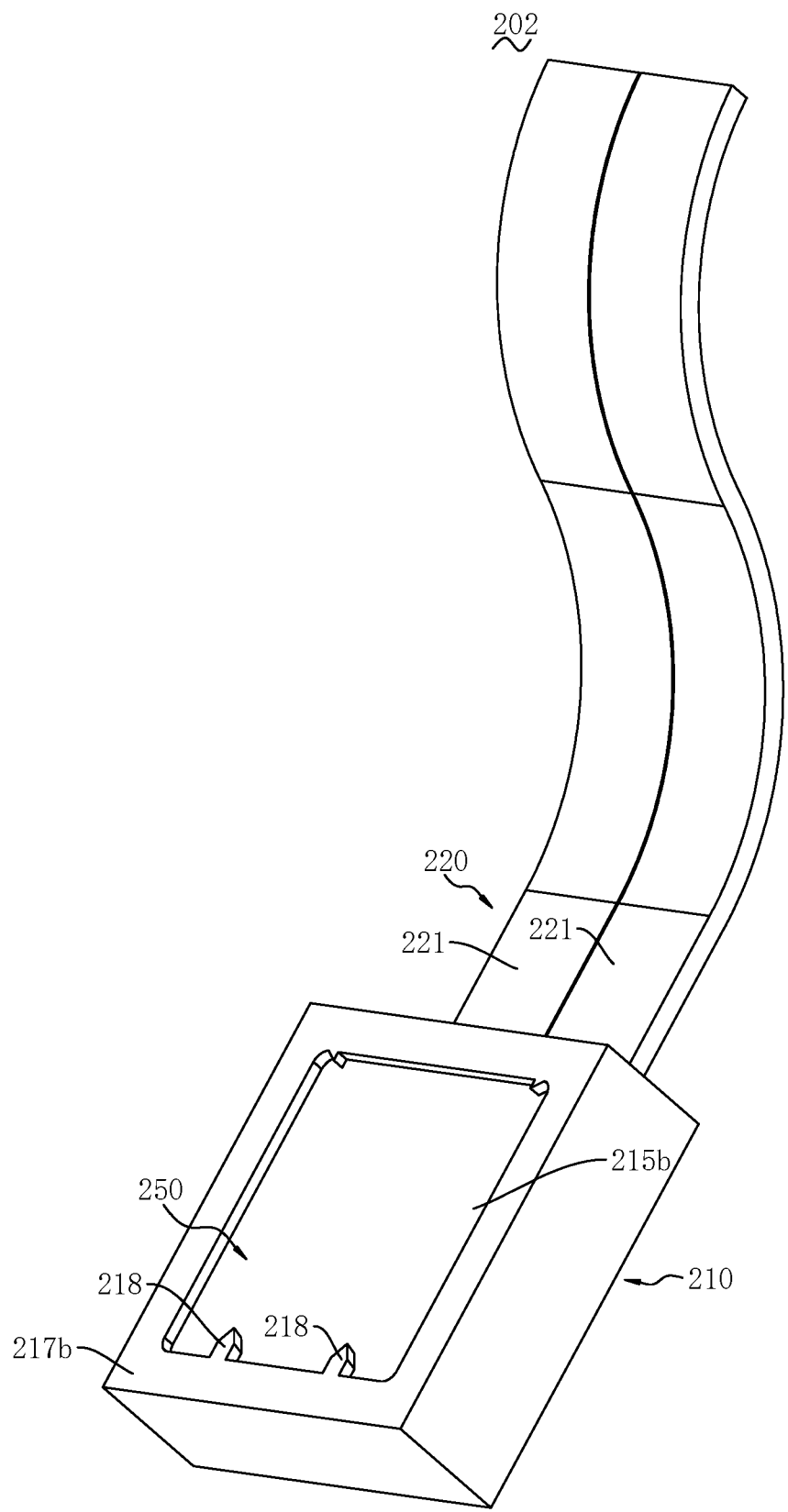
FIG. 11 is a structural diagram of a fifth embodiment of a temperature measuring assembly with a shown top face of a holding frame according to the present disclosure.

Along with reference to FIG. 10, the holding frame 210 is arranged for supporting the temperature measuring element 230. The holding frame 210 has a mounting cavity 215. The holding frame 210 has a bottom face 217a and a top face 217b. In the present embodiment, both the bottom face 217a and the top face 217b are planar. The mounting cavity 215 is arranged for accommodating the temperature measuring element 230. In the present embodiment, the mounting cavity 215 is configured to be a through-cavity. In the present embodiment, the mounting cavity 215 penetrates through a top end and a bottom end of the holding frame 210 along a top-down direction shown in FIG. 15. Accordingly, one end of the mounting cavity 215 has a mounting opening 215a, and the other end has an accommodation opening 215b. In the present embodiment, one end of the mounting cavity 215 is the top end in a top-down direction shown in FIG. 15, and the other end is the bottom end. The holding frame 210 has four side walls, and the holding frame 210 encloses a substantially rectangular frame.

A limiting notch 213 is provided on one side wall of the holding frame 210. The limiting notch 213 is arranged for accommodating the output connecting element 220 and may hold the output connecting element 220. The limiting notch 213 comprises a pair of limiting walls 213a, 213b directly facing each other. The limiting walls 213a, 213b are arranged to abut against the output connecting element 220. It may be understood that without specific indication, the term "abut" may refer to directly abutting with contact between two components or indirectly abutting through a transmission action of a third part.

In the present embodiment, to enhance the holding performance of the holding frame 210 on the output connecting element 220 and to facilitate dismantling, the limiting walls 213a, 213b are provided with a limiting convex rib 214, respectively. The limiting convex rib 214 is arranged to abut against the output connecting element 220. In the present embodiment, the limiting convex rib 214 is arranged to directly abut against the output connecting element 220. The specific shape of the limiting convex rib 214 is required only to be capable of abutting against the output connecting element 220. In the present embodiment, the limiting convex rib 214 is of a substantially triangular prism shape.

To allow the temperature measuring assembly 201 to be compactly assembled and the temperature measuring element 230 to approach or abut against a heat conducting element 240 (as will be described infra) as much as possible, a clamping arm 216 is provided on a side wall of the holding frame 210. The clamping arm 216 extends into the mounting cavity 215 and is arranged to abut against the output connecting element 220, and may allow the output connecting element 220 to abut against the heat conducting element 240 (as will be described infra). In other words, the clamping arm 216 and the heat conducting element 240 are arranged to clamp the output connecting element 220. The specific structure, number, and distribution of the holding arm 216 are only required to be capable of contacting or abutting against the output connecting element 220 when the temperature measuring assembly 201 is integrally assembled. In the present embodiment, the clamping arms 216 are substantially connected to strip-like crossbars on the two side walls of the holding frame 210, respectively. To further enhance the limiting and holding performance on the output connecting element 220 and allow the temperature measuring element 230 to approach or contact the heat conducting element 240 described below as much as possible, there are two clamping arms 216 in the present embodiment. The two clamping arms 216 are spaced apart and distributed on two sides of the temperature measuring element 230.

In order to enhance the performance of the holding frame 210 to hold integrally with a sealing connection element 250 (as will be described infra), a retaining part 218 is provided on an inner sidewall of the holding frame 210. The retaining part 218 extends to a top notch 212b. The specific shape, number and distribution of the retaining part 218 are only required to be capable of blocking the sealing connection element 250 from being separated from the mounting cavity 215 at the top notch 212b. In the present embodiment, the retaining part 218 is of a columnar shape with a gradual increase of a protruding size from the bottom to the top of the mounting cavity 215.

In order to enhance the secure holding performance on the heat conducting element 240 (as will be described infra) and facilitate the dismantling of the heat conducting element 240, an abutting convex rib 219 is provided to protrude from an inner side wall of the holding frame 210. The abutting convex rib 219 may abut against the heat conducting element 240 (as will be described infra). The specific shape, number, and distribution of the abutting rib 219 are only required to be capable of strengthening the abutting against the heat conducting element 240 described below. In the present embodiment, there are a plurality of abutting convex ribs 219 which are distributed on a plurality of inner side walls of the holding frame 210, respectively. The abutting rib 219 may be any protruding part. In the present embodiment, the abutting convex rib 219 is of a substantially triangular prism shape.

In order to enhance the integral and secure performance of the holding frame 210, the holding frame 210 is an integral element. In order to enhance the insulation performance of the holding frame 210 and save manufacturing cost, the holding frame 210 is an injection-molded part. In other words, the holding frame 210 is an injection-molded integral part in the present embodiment.

With continuous reference to FIG. 9, the output connecting element 220 is connected to the temperature measuring element 230 and may output an electrical signal outputted by the temperature measuring element 230. The output connecting element 220 comprises an electrically conductive part 223. The electrically conductive part 223 extends from an end part of the output connecting element 220 and is disposed in the holding frame 210. That is to say, the electrically conductive part 223 is arranged to protrude at one end of the output connecting element 220 and extend into the holding frame 210. The electrically conductive part 223 may be the previously mentioned electrically conductive layer 31. The output connecting element 220 may be connected with other processing parts, e.g., a processor, to process the outputted electrical signal. At least part of the output connecting element 220 extends into the mounting cavity 215 and is disposed on the holding frame 210. The specification and type of the output connecting element 220 may be selected according to connection needs, which, for example, may be a printed circuit board (PCB) or a common wire. In the present embodiment, the output connecting element 220 is a flexible flat cable (FFC). Specifically, the flexible flat cable includes an insulation layer 221 and electrically conductive layers 223a, 223b. The insulation layer 221 wraps up part of the electrically conductive layers 223a, 223b and is arranged in electrical insulation. The insulation layer 221 may be made of any insulation material. The electrically conductive layers 223a, 223b protrude from the insulation layer 221 and partially extend into the mounting cavity 215 so as to be arranged in electrical connection with the temperature measuring element 230. To enhance the secure electrical connection performance, in the present embodiment, the output connecting element 220 is connected with the temperature measuring element 230 by welding. Specifically, the electrically conductive layers 223a, 223b are connected with the temperature measuring element 230 by welding, respectively. It needs to be noted that unless otherwise indicated herein, the electrically conductive layers 223a, 223b of the flexible flat cable are an embodiment of the electrically conductive part of the output connecting element 220.

With continuous reference to FIG. 9, the temperature measuring element 230 is accommodated in the mounting cavity 215 and electrically connected to the output connecting element 220. The type of the temperature measuring element 230 may be selected according to application needs. In the present embodiment, the temperature measuring element 230 is arranged for detecting a temperature of an object to be measured (not shown). Specifically, the temperature measuring element 230 is a temperature sensor. The temperature measuring element 230 may be a thermistor. In the present embodiment, the temperature measuring element 230 is a negative temperature coefficient (NTC) thermistor. To reduce thermal resistance as much as possible so as to enhance temperature measurement precision and response speed, the temperature measuring element 230 may be arranged to be in contact with the heat conducting element 240 (as will be described infra). In the present embodiment, the temperature measuring element 230 uses an NTC resistor as an SMD element, thereby facilitating assembly and saving space. The temperature measuring element 230 may also adopt other SMD elements.

Embodiment 5

With reference to FIGS. 11 to 15, as a variation of Embodiment 4, the present disclosure provides another temperature measuring assembly 202. The temperature measuring assembly 202 further comprises a heat conducting element 240. The heat conducting element 240 is provided within the mounting cavity 215 and is in thermal conductive connection with the temperature measuring element 230.

Figure 12:
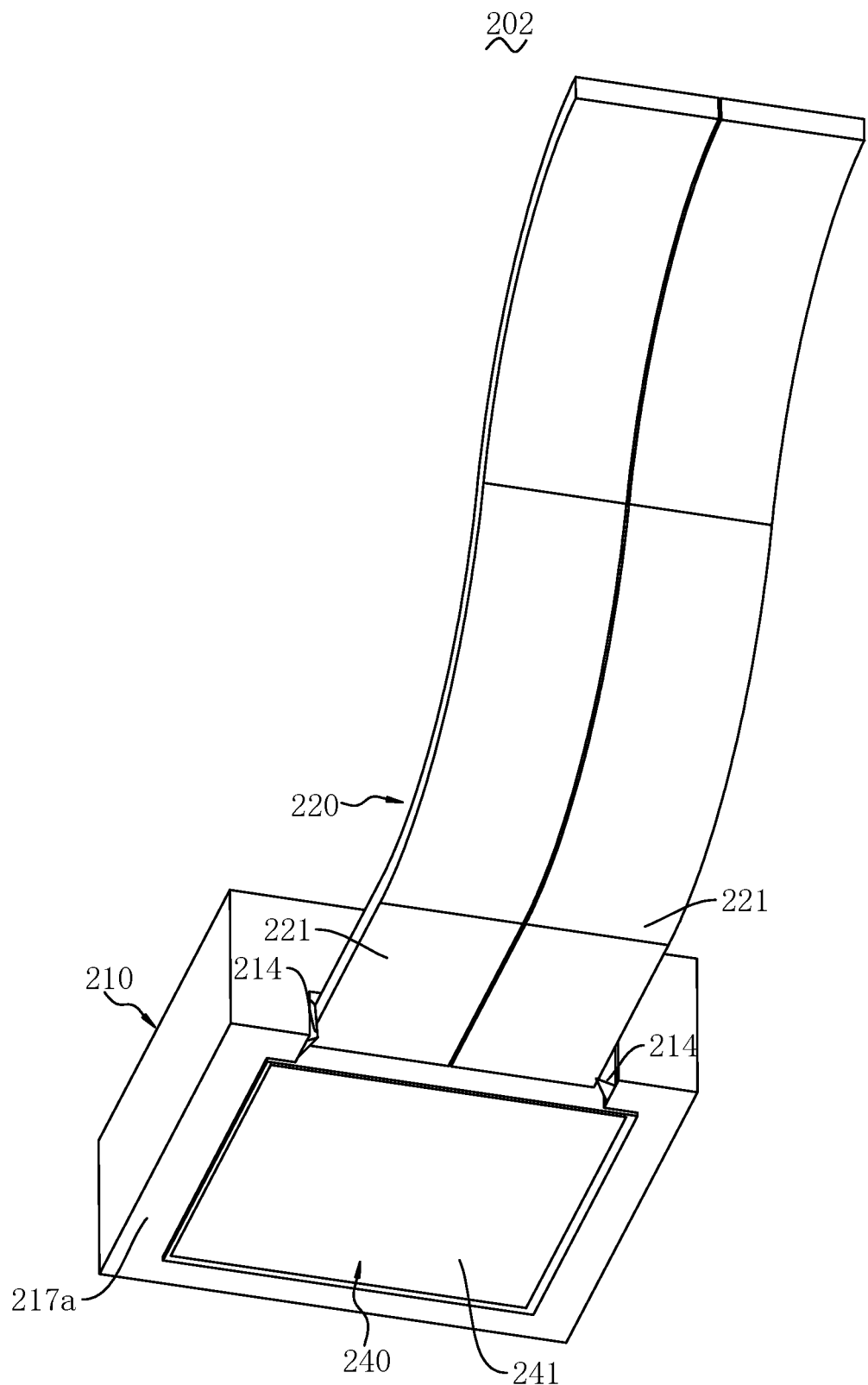
FIG. 12 is a structural diagram of the holding frame of the temperature measuring assembly of FIG. 11 with a shown bottom face.
Figure 13:
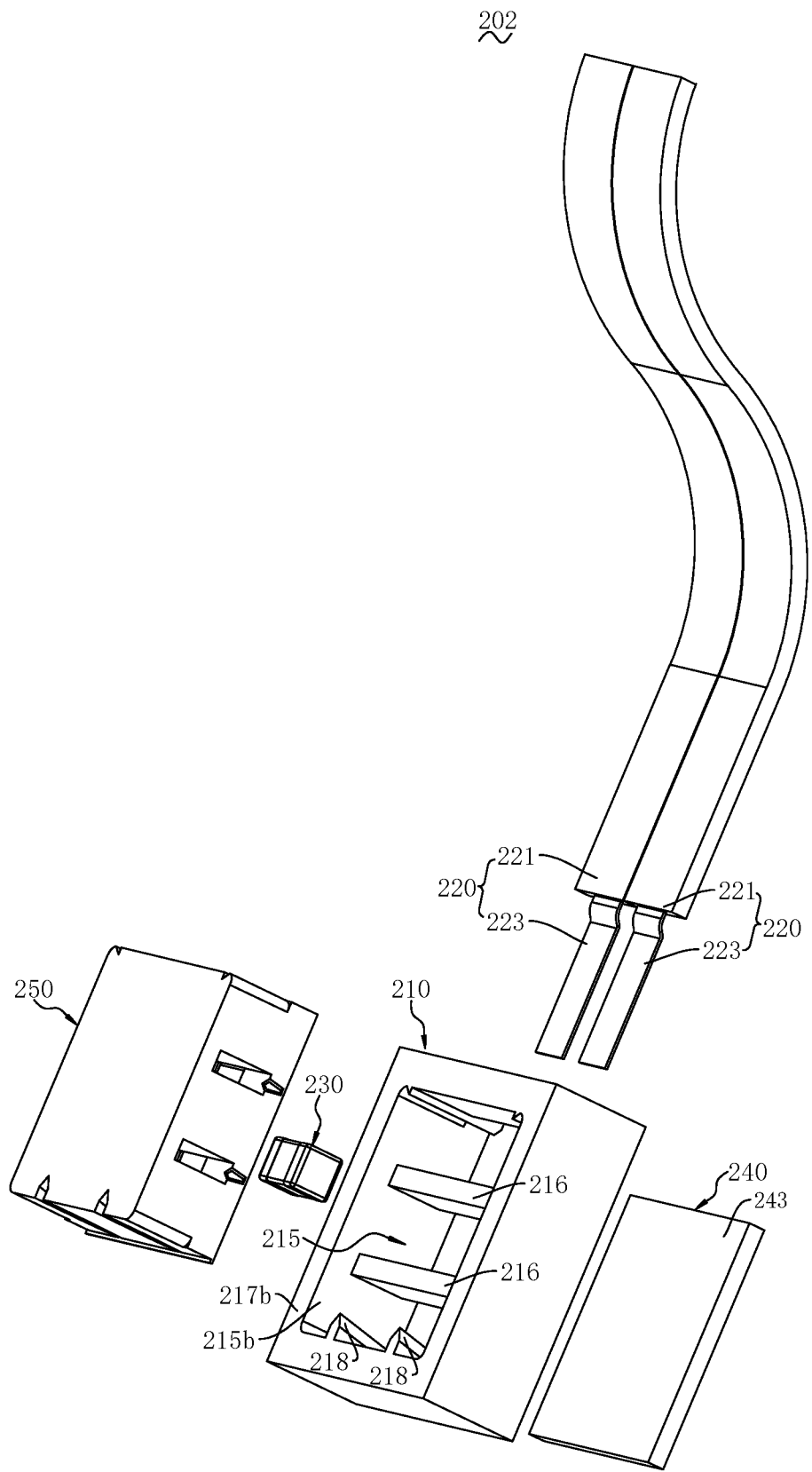
FIG. 13 is an exploded view of the temperature measuring assembly of FIG. 11.

With continuous reference to FIGS. 12 and 13, the specific material and structure of the heat conducting element 240 is only required to be capable of satisfying corresponding requirements of heat transmission. The heat conducting element 240 includes a heat conducting bottom face 241 and a heat conducting top face 243. The heat conducting top face 243 is arranged to directly face or contact with the temperature measuring element 230. In the present embodiment, the heat conducting top face 243 is a plane. To enlarge the contact area and enhance the temperature measurement precision and response speed, the heat conducting bottom face 241 is a plane. The heat conducting bottom face 241 may be in direct contact with the object to be measured. In the present embodiment, the heat conducting element 240 is of a substantially rectangular plate shape. To reduce thermal resistance so as to improve temperature measuring precision and reaction speed, the heat conducting element 240 may be made of a material with a relatively high thermal conductivity. In the present embodiment, the heat conducting element 240 is a ceramic plate. When mounting, the heat conducting element 240 is mounted into the mounting cavity 215 from a mounting opening 215a of the mounting cavity 215 and is at least partially accommodated in the mounting cavity 215. To facilitate thermal contact with a to-be-measured object of any shape and dimension, the heat conducting element 240 is arranged to protrude from a bottom face 217a of the holding frame 210 in the present embodiment. In other words, part of the heat conducting element 240 extends outside of the mounting cavity 215.

Figure 14:
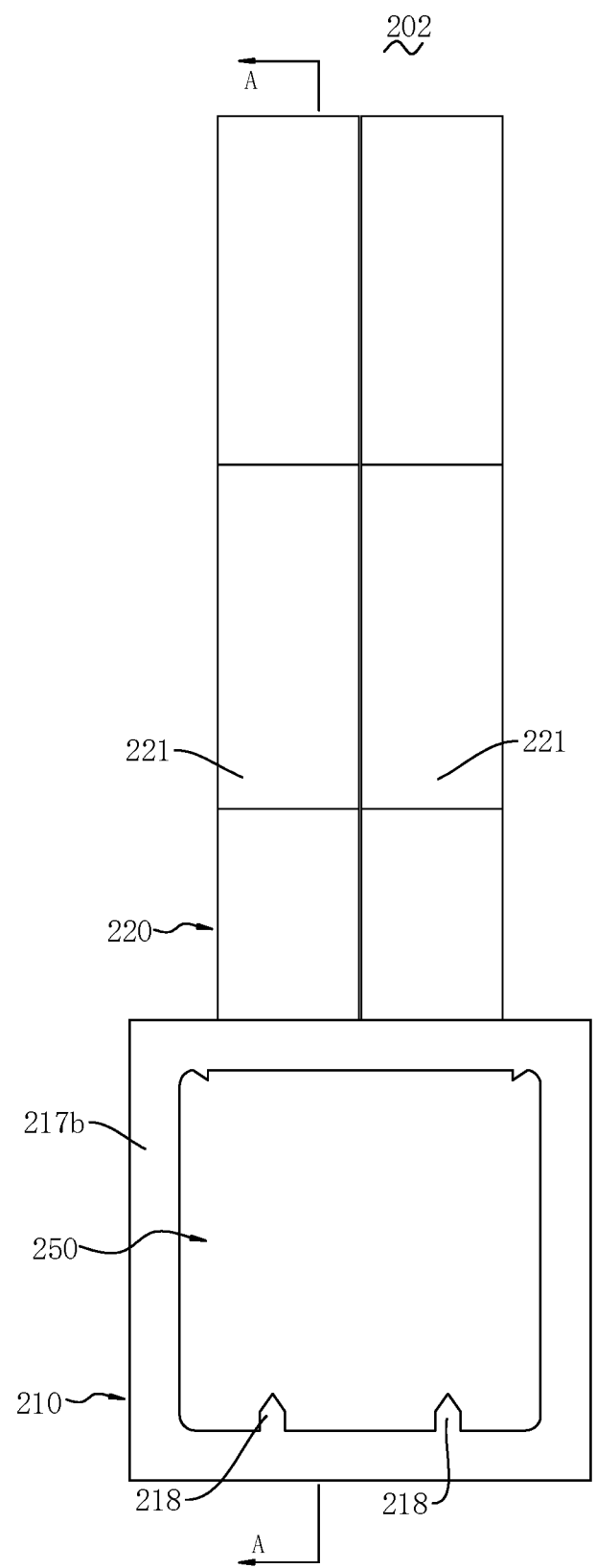
FIG. 14 is a projection diagram of the temperature measuring assembly of FIG. 11 from a top face to a bottom face of the holding frame.
Figure 15:
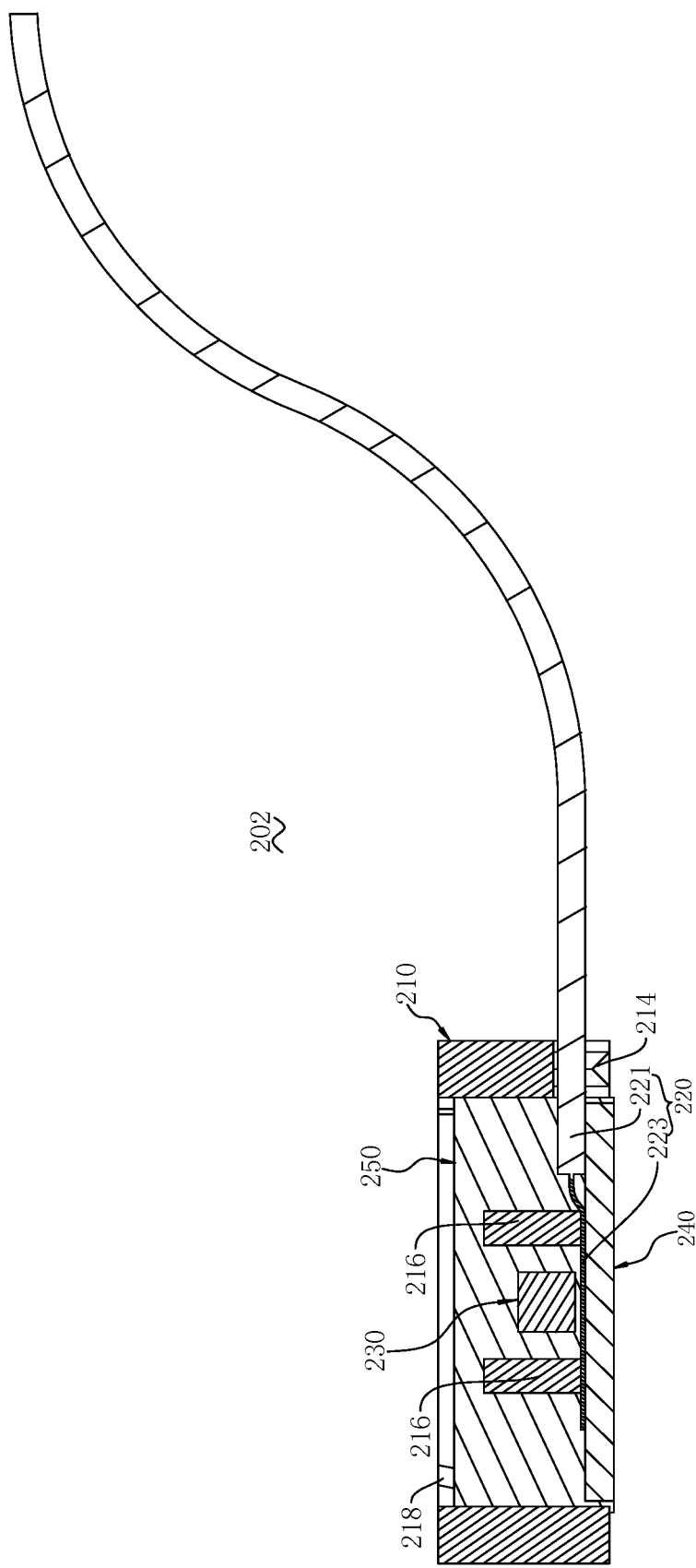
FIG. 15 is a sectional view of the temperature measuring assembly of FIG. 14 along line A-A.

With continuous reference to FIGS. 13 to 15, to further enhance the sealing and protection performance on the temperature measuring element 230 and improve the thermal conductive performance, the temperature measuring assembly 202 further comprises a sealing connection element 250. The sealing connection element 250 is accommodated in the mounting cavity 215 and is arranged to wrap up and seal the temperature measuring element 230. Specifically, the sealing connection element 250 is accommodated into the mounting cavity 215 from an accommodation opening 215b of the mounting cavity 215. The material and structure of the sealing connection element 250 are only required to be capable of sealing the temperature measuring element 230. In order to enhance the sealing and protection performance on the temperature measuring element 230, the sealing connection element 250 may be a cured glue layer, i.e., a cured layer formed to seal and enclose the temperature measuring element 230 by infusing glue into the mounting cavity 215. In the present embodiment, the sealing connection element 250 is a cured silicone layer, i.e., a cured layer formed by infusing melt silicone into the mounting cavity 215. The sealing connection element 250 is filled within the mounting cavity 215 and is arranged to be in contact with the side walls of the mounting cavity 215 to enhance a performance of integrally holding with the holding frame 210. Specifically, the melt silicone glue liquid is infused into the mounting cavity 215 from the accommodation opening 215b of the mounting cavity 215 and is cured as the sealing connection element 250.

Embodiment 6

The present disclosure further provides an electrical device. The electrical device comprises a to-be-measured device (not shown) and the temperature measuring assembly 102, 103, 201 or 202 as described in the embodiments above. The to-be-measured device and the heat conducting element 10 are arranged in thermal conduction.

The specification and type of the to-be-measured device may be selected according to needs. In the present embodiment, the to-be-measured device is a bus-bar. The to-be-measured device is arranged for being electrically connected with a battery pack. Due to a relatively large current passing through the to-be-measured device, an excessively high-temperature issue very easily occurs, and therefore the temperature measuring assembly 102, 103, 201 or 202 is needed to monitor the temperature. In order to shorten the response time of the temperature measuring element 10, the to-be-measured device is arranged to be in contact with the heat conducting element 10. Specifically, the to-be-measured device is provided in plane-to-plane contact with the second heat conducting face 13.

What have been described above are only preferred embodiments of the present disclosure, and not intended to limit the protection scope of the present disclosure. Any modifications, equivalent substitutions or improvements within the spirit of the present disclosure should be included within the scope as defined by the claims of the present disclosure.

What is claimed is:

1. A temperature measuring assembly for measuring the temperature of a device, comprising:
   a heat conducting element for conducting heat from the device to be measured, the heat conducting element having a contacting surface in direct contact to a contact area of the device; and
   a temperature measuring element arranged to be thermally conductive with the heat conducting element so as to measure a temperature signal of the device according to the heat conducted by the heat conducting element and output the temperature signal to an output connecting element;
   the output connecting element being a flexible flat cable which includes two electrically conductive layers, the electrically conductive layers having first electrically conductive surfaces and second electrically conductive surfaces disposed back-to-back, the first electrically conductive surface being configured to be connected with the temperature measuring element and the second electrically conductive surface being provided to be in face-to-face contact with the heat conducting element;
   wherein the heat conducting element and the temperature measuring element are formed separately.

2. The temperature measuring assembly according to claim 1, wherein the heat conducting element is a ceramic element.

3. The temperature measuring assembly according to claim 1, wherein the heat conducting element has a first heat conducting face and a second heat conducting face, which are disposed back-to-back;
   the first heat conducting face is arranged to be thermally conductive with the temperature measuring element; and
   the second heat conducting face is arranged to be thermally conductive with the device.

4. The temperature measuring assembly according to claim 1, wherein the output connecting element is arranged to extend between the temperature measuring element and the heat conducting element.

5. The temperature measuring assembly according to claim wherein the first electrically conductive surface is configured to be connected with the temperature measuring element by welding.

6. The temperature measuring assembly according to claim 1, wherein the two electrically conductive layers are disposed at an interval; and the temperature measuring element is arranged to at least partially extend into contact with the heat conducting element.

7. The temperature measuring assembly according to claim 1, further comprising a sealing connection element; wherein the sealing connection element is in contact with the heat conducting element and the temperature measuring element, and integrally connects the heat conducting element and the temperature measuring element.

8. The temperature measuring assembly according to claim 7, wherein a thermal conductivity of the heat conducting element is greater than that of the sealing connection element.

9. The temperature measuring assembly according to claim 7, wherein the sealing connection element is arranged to cover and enclose the temperature measuring element so as to seal the temperature measuring element.

10. The temperature measuring assembly according to claim 7, wherein the sealing connection element is a cured body of a liquid glue or a cured body of a melt silicone liquid.

11. The temperature measuring assembly according to claim 1, further comprising a holding frame that has a mounting cavity, wherein said temperature measuring elements is accommodated in the mounting cavity.

12. The temperature measuring assembly according to claim 11, wherein one end of the mounting cavity has a mounting opening, and at least part of the heat conducting element is accommodated in the mounting cavity from the mounting opening.

13. The temperature measuring assembly according to claim 11, further comprising an output connecting element, wherein the output connecting element is electrically connected to the temperature measuring element.

14. The temperature measuring assembly according to claim 11, wherein a limiting notch is provided on one side wall of the holding frame; the limiting notch is arranged to be in communication with the mounting cavity, and part of the output connecting element is provided in the limiting notch.

15. The temperature measuring assembly according to claim 11, further comprising a sealing connection element that is accommodated in the mounting cavity, wraps up and seals the temperature measuring element.

16. An electrical device, comprising the device and the temperature measuring assembly according to claim 1, wherein the device is arranged to be in thermal conduction with the heat conducting element.

17. The electrical device according to claim 16, wherein device is a bus-bar.

18. A temperature measuring assembly for measuring the temperature of a device, the temperature measuring assembly comprising:
   a heat conducting element for conducting heat from the device to be measured, the heat conducting element having a contacting surface in direct contact to a contact area of the device;
   an output connecting element having an electrically conductive portion, the output connecting element being a flexible flat cable which includes two electrically conductive layers, the electrically conductive layers having a first electrically conductive surface and a second electrically conductive surface disposed back-to-back, the first electrically conductive surface is configured to be connected with the temperature measuring element;
   a temperature measuring element arranged to be thermally conductive with the heat conducting element so as to measure a temperature signal of the device according to the heat conducted by the heat conducting element, the temperature measuring element being electrically connected to the second electrically conductive surface of the output connecting element to output the temperature signal;
   a sealing connection element fixing the temperature measuring element onto the heat conducting element;
   wherein the heat conducting element and the temperature measuring element are formed separately.

* * * * *